United States Patent
Cirelli et al.

(10) Patent No.: US 6,392,787 B1
(45) Date of Patent: May 21, 2002

(54) PROCESS FOR FABRICATING ARTICLE COMPRISING PHOTONIC BAND GAP MATERIAL

(75) Inventors: Raymond A. Cirelli, Hillsborough; Omkaram Nalamasu, Bridgewater; Sanjay Patel, New Providence; Stanley Pau, North Plainfield; George P Watson, Avon; Christopher Alan White, Basking Ridge, all of NJ (US); Robert Waverly Zehner, Cambridge, MA (US)

(73) Assignee: Agere Systems Guardian Corp., Orlando, FL (US)

( * ) Notice: Subject to any disclaimer, the term of this patent is extended or adjusted under 35 U.S.C. 154(b) by 25 days.

(21) Appl. No.: 09/653,916

(22) Filed: Sep. 1, 2000

(51) Int. Cl.[7] .............................. G02F 1/00; G02F 1/07; G02F 1/10; G02B 1/10; G02B 6/10; H10L 21/461; H10L 21/311

(52) U.S. Cl. ....................... 359/321; 359/248; 359/587; 438/690; 438/697; 385/131; 385/132

(58) Field of Search ................................ 117/1; 216/56, 216/92; 359/248, 321, 328, 322, 587; 385/14, 131, 132; 438/31, 32, 57, 690, 697

(56) References Cited

U.S. PATENT DOCUMENTS

| | | | |
|---|---|---|---|
| 5,172,267 A | | 12/1992 | Yablonovitch ............... 359/515 |
| 5,335,240 A | * | 8/1994 | Ho et al. ...................... 372/39 |
| 5,440,421 A | | 8/1995 | Fan et al. ..................... 359/245 |
| 5,600,483 A | | 2/1997 | Fan et al. ..................... 359/245 |
| 5,990,850 A | * | 11/1999 | Brown et al. ................ 343/912 |
| 5,997,795 A | * | 12/1999 | Danforth et al. ............. 264/401 |
| 5,998,298 A | * | 12/1999 | Fleming et al. .............. 438/692 |
| 6,064,511 A | * | 5/2000 | Fortmann et al. ............ 359/321 |
| 6,274,293 B1 | * | 8/2001 | Gupta et al. ................. 430/315 |

FOREIGN PATENT DOCUMENTS

WO    WO 98/15828 A1 *  4/1998 ............ G02B/6/12

OTHER PUBLICATIONS

P.S.J. Russell, "Photonic Band Gaps," *Physics World*, 37 (1992).
I. Amato, "Designing Crystals That Say No To Protons," *Science*, vol. 255, 1512 (1993).
B.T. Holland et al., "Synthesis of Macroporous Minerals with Highly Ordered Three–Dimensional Arrays of Spheroidal Voids," *Science*, vol. 281, 538 (1998).
E.G. Judith et al., Preparation of Photonic Crystals Made of Air Spheres in Titania, *Science*, vol. 281, 802 (1998).
A.A. Zakhidov et al., "Carbon Structures with Three–Dimensional Periodicity at Optical Wavelengths,"*Science*, vol. 282, 897 (1998).

(List continued on next page.)

*Primary Examiner*—Georgia Epps
*Assistant Examiner*—David N. Spector
(74) *Attorney, Agent, or Firm*—Scott J. Rittman

(57) ABSTRACT

An improved lithographic process for fabricating articles comprising photonic band gap materials with micron-scale periodicities is provided, the process readily capable of being performed by current lithographic processes and equipment. The process involves providing a three-dimensional structure made up of a plurality of stacked layers, where each layer contains a substantially planar lattice of shapes of a first material, typically silicon, with interstices between the shapes. Each shape contacts at least one shape of an adjacent layer, the interstices throughout the plurality of layers are interconnected, and the interstices comprise a second material, e.g., silicon dioxide. Typically, the second material is etched from the interconnected interstices to provide a structure of the first material and air, this structure designed to provide a particular photonic band gap.

28 Claims, 3 Drawing Sheets

OTHER PUBLICATIONS

S-Y Lin et al., "A Three-Dimensional Optical Photonic Crystal," *Journal of Lightwave Technology*, vol. 17, No. 11, 1944 (1999).

E. Yablonovitch et al., *Phys. Rev. Lett.*, 67, 2295-2298 (1991).

S. Noda et al., "Full Three-Dimensional Photonic Bandgap Crystals at Near-Infrared Wavelengths," *Science*, vol. 289 (2000).

J. D. Joannopoulos, et al., "Photonic Crystals: Putting a New Twist on Light", *NanoNews* (1997).

* cited by examiner

PROCESS FOR FABRICATING ARTICLE COMPRISING PHOTONIC BAND GAP MATERIAL

BACKGROUND OF THE INVENTION

1. Field of the Invention

The invention relates to photonic band gap materials, particularly techniques for forming such materials.

2. Discussion of the Related Art

Recently, there has been increasing interest in periodic dielectric structures, also referred to as photonic crystals (PC) for numerous photonics applications. Of particular interest are photonic crystals exhibiting gaps in photonic band structures, referred to as photonic band gap (PBG) materials. See, e.g., P. S. J. Russell, "Photonic Band Gaps," *Physics World*, 37, August 1992; I. Amato, "Designing Crystals That Say No to Photons," *Science*, Vol. 255, 1512 (1993); and U.S. Pat. Nos. 5,600,483 and 5,172,267. PBG materials exhibit a photonic band gap, analogous to a semiconductor's electronic band gap, that suppresses propagation of certain frequencies of light, thereby offering, for example, photon localization or inhibition of spontaneous emissions.

PBG materials are generally formed by providing a high refractive index dielectric material with a three-dimensional lattice of cavities or voids having low refractive index. Electromagnetic radiation tends to localize within the high dielectric material to achieve a lower overall energy. As the feature size of the material approaches the wavelength of the radiation, this localization is inhibited by the finite region of space which the field must occupy, and the field must therefore spread over both the high and low dielectric regions. The energy of the radiation, and thus the frequency, varies accordingly with the distribution of the field in the high and low dielectric regions. Thus, for systems which exhibit a spatially varying dielectric profile, the energy of the field tends to depend strongly on the wavelength of the radiation and on the direction of propagation. For periodic systems, this variation in energies can be portrayed in a band structure diagram. And because the structures of interest typically show a gap in energies in such a band structure, they have been deemed photonic bandgap materials.

The concept and theory of PBG materials has been extensively studied, but experimental realization of such theory has proven to be difficult. In particular, it has been difficult to organize a three-dimensional lattice with periodicities of a micron scale, i.e., for optical and near-infrared frequencies. (Periodicities on a micron scale, as used herein, indicate that a structure contains repeating units, the repetition occurring at a distance falling within the range 0.1 $\mu$m to 100 $\mu$m.) Materials of larger periodicities, e.g., centimeter and millimeter scale, which are suitable for microwave applications, have been easier to prepare.

In one early approach to PC formation, reflected in the above-cited U.S. Patents, solid materials are provided with numerous holes by a mechanical technique such as drilling. This approach has provided useful results, but is limited by the ability of current processing technology to provide the necessary structure. Drilling, for example, is not capable of providing periodicity on a micron scale.

In another approach, ordered colloidal suspensions or sediments of relative low refractive index particles such as silicon dioxide or polystyrene, referred to as colloidal crystals, are used as templates for infiltration or deposition of high refractive index materials in a desired structure, and the particles are then etched away or burned out to provide the voids. See, e.g., B. T. Holland et al., "Synthesis of Macroporous Minerals with Highly Ordered Three-Dimensional Arrays of Spheroidal Voids," *Science*, Vol. 281, 538 (July 1998); E. G. Judith et al., "Preparation of Photonic Crystals Made of Air Spheres in Titania," *Science*, Vol. 281, 802 (July 1998); and A. A. Zakhidov et al., "Carbon Structures with Three-Dimensional Periodicity at Optical Wavelengths," *Science*, Vol. 282, 897 (October 1998). The infiltration/deposition has been performed, for example, by an alkoxide sol-gel technique and by chemical vapor deposition. The results attained thus far have been interesting, but have not yet proven a commercially feasible process.

In seeking techniques for providing periodicities on a micron scale, lithography of silicon has become a prime candidate. Specifically, silicon has a high dielectric constant (12.1 at 1.55 $\mu$m) and is transparent in the infrared regime. Also, extensive work in patterning silicon on a micron scale has already been done for microelectronic applications. Unfortunately, extending the two-dimensional knowledge from such microelectronics applications to the three-dimensional periodic structures necessary for PBG materials has proven to be difficult. One group has published an approach for the initial stages of preparing a logpile structure in silicon (S-Y Lin and J. G. Fleming, "A Three-Dimensional Optical Photonic Crystal," *Journal of Lightwave Technology*, Vol. 17, No. 11, 1944 (1999).) According to this approach, formation of silicon bars 180 nm wide is required to achieve a bandgap at a desired wavelength of 1.55 $\mu$m. The group, however, has only reported results for a five-layer stack, which is believed to be too thin to exhibit a complete band gap. And the small width of the silicon bars substantially increases the difficulty and complexity of forming a sufficient three-dimensional structure.

Another group has proposed a structure theoretically capable of being formed through a series of lithographic steps in silicon. (U.S. Pat. Nos. 5,440,421 and 5,600,483 to Fan et al.) However, the structure is exceedingly complex, and realization of the structure would be extremely difficult given even the best available lithographic techniques. In particular, their approach requires etching narrow holes with very high aspect ratios through dissimilar materials, at the conclusion of the fabrication process.

It would therefore be desirable to develop processes for fabrication of PBG materials having periodicities on a micron scale, where such processes are more readily performed than currently proposed techniques.

SUMMARY OF THE INVENTION

The invention provides a improved lithographic process for fabricating articles comprising photonic band gap materials with micron-scale periodicities. Significantly, and in contrast to other proposed techniques, the approach of the invention is able to be readily performed by current lithographic processes and equipment.

In general terms, the process of the invention involves providing a three-dimensional structure made up of a plurality of stacked layers, where each layer contains a substantially planar lattice comprising shapes of a first material, typically silicon, with interstices between the shapes. Each shape contacts at least one shape of an adjacent layer, the interstices throughout the plurality of layers are interconnected, and the interstices comprise a second material, e.g., silicon dioxide. Typically, the second material is etched from the interconnected interstices to provide a structure of the first material and air. The shapes are generally extruded shapes, e.g., cylinders or squares, which tend to ease the lithographic process. (Optionally, the lattices further comprise one or more engineered defects, or portions thereof, including point defects, line defects, plane defects, and other defects that provide desired properties.)

In one aspect (reflected in FIGS. 1A to 1H), the process involves forming a silicon layer 14 on a substrate 10 (the layer formed in an x-y plane), etching a lattice of extruded shapes 16, e.g., cylinders, in the silicon layer, forming a silica on dioxide layer 18 on the lattice, and planarizing the silicon dioxide layer down to the top surfaces of the extruded shapes (see FIG. 1D). These steps are then repeated for, e.g., second, third, fourth, and fifth silicon layers. However, as reflected in FIGS. 1F–1H, the (x,y) location of each lattice is shifted from the (x,y) location of the immediately preceding lattice by a distance, d, in a direction along the x or y axis according to the repeating sequence x, y, -x, -y.

For example, the second lattice is shifted a distance d in the x direction relative to the (x,y) location of the first lattice, the third lattice is shifted the same distance d in the y direction relative to the (x,y) location of the second lattice, the fourth lattice is shifted the distance d in the -x direction relative to the (x,y) location of the third lattice, and the fifth lattice is shifted the distance d in the -y direction relative to the (x,y) location of the fourth lattice. This sequence puts the fifth lattice directly over the first lattice, i.e., at the same x-y coordinates (see FIG. 1H). Once the desired number of lattices are formed, the silicon dioxide is etched to provide a silicon/air structure, as shown in FIG. 2. (In addition to the above technique, is it possible to first deposit a layer of the second material, e.g., silicon dioxide, etch out the lattice of shapes from the second material, and then deposit a layer of the first material, e.g., silicon, into the etched-out shapes.)

In one particular design, the extruded shapes are silicon cylinders with a diameter of about 390 nm and a height of about 210 nm, the columns within each lattice have a pitch of 600 nm, and d is 300 nm. In this configuration, the structure is calculated to exhibit a three-dimensional photonic bandgap centered at about 1.55 $\mu$m and extending from about 1.45 to about 1.65 $\mu$m, which completely covers the commonly-used optical communications band of 1.5 to 1.6 $\mu$m.

DETAILED DESCRIPTION OF THE INVENTION

Figure 1A:
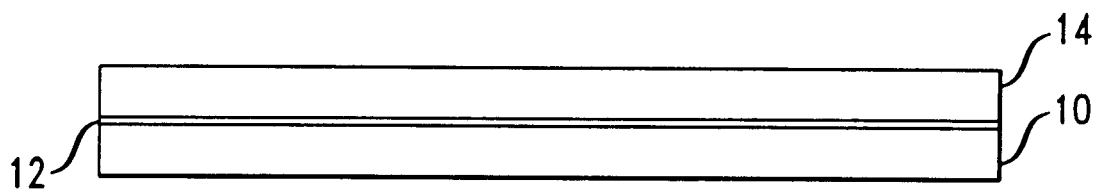
FIGS. 1A–1H illustrate an embodiment of the process of the invention.

The photonic band gap characteristics of a periodic array are determined by two factors—the symmetry of the unit cell, and the crystal symmetry with which this unit cell is replicated in space, i.e., in the overall structure. It is generally accepted that the overall crystal symmetry should be as close to spherical as possible, to ensure that light entering at any angle will see approximately the same periodicity. However, it is also important that the unit cell not have spherical symmetry, in order to break the degeneracy of the bands at certain points. (See, e.g., Yablonovitch, E.; Gmmitter, T. J., *Phys. Rev. Lett.,* 1991, 67, 2295–2298.) For example, a simple FCC unit cell exhibits spherical symmetry and thus does not have a gap between low-order bands. Other crystals with FCC lattices, such as the diamond lattice and the Yablonovite and logpile structure, do exhibit gaps. In accordance with these requirements, the invention provides a structure that exhibits a substantially spherical symmetry, but with a unit cell that provides the necessary break in degeneracy.

As a typical approach, the process of the invention is primarily designed to provide structures that contain a first material, e.g., silicon, and air. The structure is generally provided by forming a composite of first and second materials, and then etching away the second material to leave the air. For convenience, the discussion below relates to use of silicon as the first material and silicon dioxide as the second material. However, other material combinations are also possible according to the guidelines herein. For example, a variety of compound semiconductors are capable of use as the first material, as are some polymeric materials. Selection of appropriate materials to contribute specific properties is within the skill of an ordinary artisan.

The invention involves the following principles:

To provide substantial refractive index contrast, a final structure of silicon and air is advantageous. To fabricate such a structure, a composite of silicon and silicon dioxide is formed, such that the silicon dioxide is able to be etched away, leaving air in its place. Thus, one desired characteristic of the process is that the interstices between silicon portions be interconnected, to allow a complete etch of the silicon dioxide. (Interconnected indicates that there exists at least one path from the silicon dioxide portions to the exterior of the structure.)

To provide a structure that is more readily formed through a series of deposition and etching processes, the silicon features are typically extruded shapes, i.e., shapes with straight sidewall profiles, such as cylinders, cubes, or other polygonal prisms. But other shapes are also possible.

To maintain reasonable resolution requirements for the lithography steps, the size of features, in the x-y plane (i.e., parallel to the underlying substrate), is advantageously at least 250 nm. Feature thicknesses, in the z-direction, as low as 10 nm are typically possible, however. Moreover, as lithographic processes improve, smaller features sizes will become more feasible.

Given the final etch of silicon dioxide from the structure, the design must provide for support of the silicon extruded shapes by underlying shapes, i.e., the design cannot provide silicon shapes supported only by the silicon dioxide, since this silicon dioxide is eventually removed.

Also, though not an essential feature, it is typically advantageous to use designs that do not require sharp corners in the x-y plane, since such corners tend to be rounded by diffraction effects during lithography. Thus, it is generally desirable to use shapes such as cylinders. However, as feature size in the x-y plane increases, it is typically possible to form sharp corners with lessened danger of such rounding. It is also possible to use modifications of photomask features to correct for such sharp corners, e.g., optical proximity corrections.

Following these principles, the process of the invention, in general terms, involves providing a three-dimensional structure made up of a plurality of stacked layers, where each layer contains a substantially planar lattice comprising shapes of a first material, typically silicon, with interstices between the shapes, and optionally an engineered defect or a portion thereof (a portion indicating that the defect may be carried through one or more layers of the structure). (Lattice indicates a group of such shapes in a substantially planar configuration, but does not indicate that the shapes within the lattice contact each other. In fact, the shapes within a lattice typically will not contact each other. As noted above, it is possible for a lattice to further contain an engineered defect or a portion thereof, in order to attain desired properties in the final structure.) Each shape contacts at least one shape of an adjacent layer, the interstices throughout the plurality of layers are interconnected, and the interstices comprise a second material, e.g., silicon dioxide. Typically, the second material is etched from the interconnected interstices to provide a structure of the first material and air.

In one embodiment of the invention, the process for forming a PBG structure is performed as follows. (The shapes for this embodiment are cylinders, although, as noted above, a variety of shapes are possible.) As reflected in FIG. 1A, a substrate is provided, typically a silicon wafer 10 with a nitride or other passivation layer 12 formed thereon. (As used herein, substrate encompasses substrates with and without such passivation layers.) The surface of the substrate 10/12 defines an x-y plane. A silicon layer 14 is then formed on the substrate by any conventional technique.

Figure 1B:
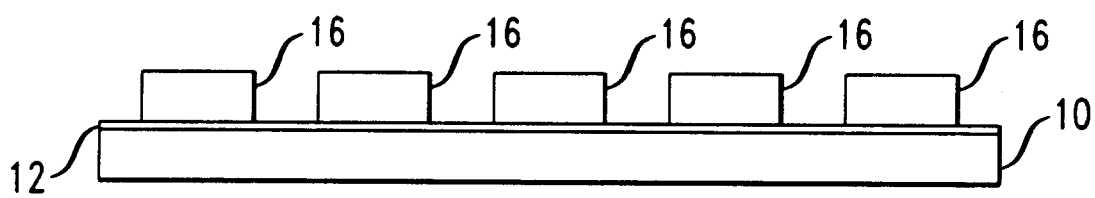

As shown in FIG. 1B, the silicon layer 14 is patterned and etched by conventional lithographic techniques, e.g., conventional deep ultraviolet lithography, to provide a lattice of silicon cylinders 16. (The top surface of the cylinders, or other extruded shapes, will not always be substantially planar with the x-y plane, but subsequent planarization is generally performed to provide a planar surface for subsequent deposition.) Generally, the etching is performed through the entire thickness of the silicon layer 14, i.e., the cylinders 16 have the same thickness as the deposited silicon layer 14. Typically, the shapes will be aligned, i.e., their vertical axes will by aligned in the same direction, although some variation is possible, as long as the variation does not substantially interfere with the properties of the final structure.

Figure 1C:
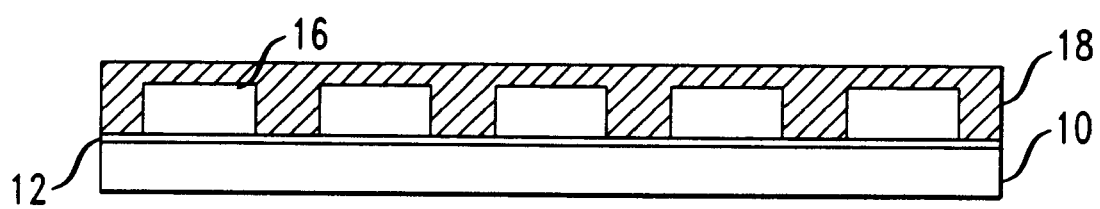
Figure 1D:
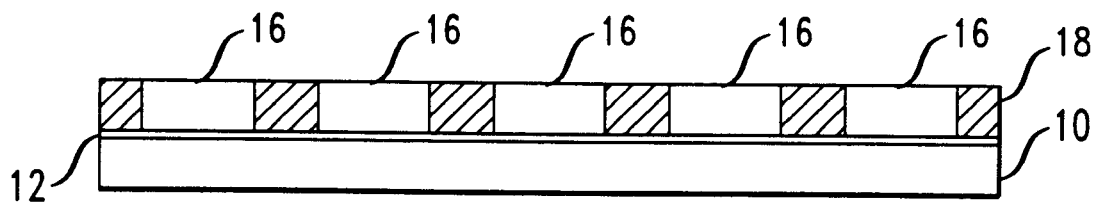

As shown in FIG. 1C, a silicon dioxide layer 18 is then formed over the lattice of cylinders 16, such that the silicon dioxide substantially fills the interstices between the cylinders 16. The silicon dioxide layer 18 is then removed down to the top surfaces of the cylinders 16, typically by a planarization technique such as chemical-mechanical planarization (CMP), providing the structure shown in FIG. 1D.

Figure 1E:
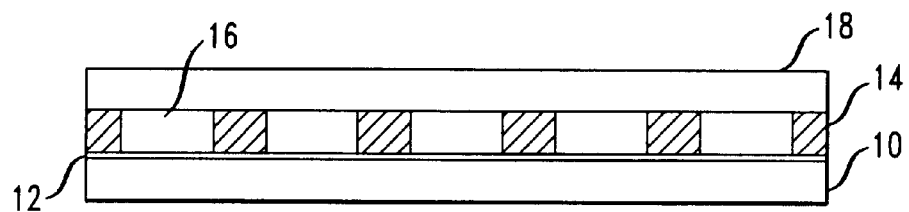
Figure 1F:
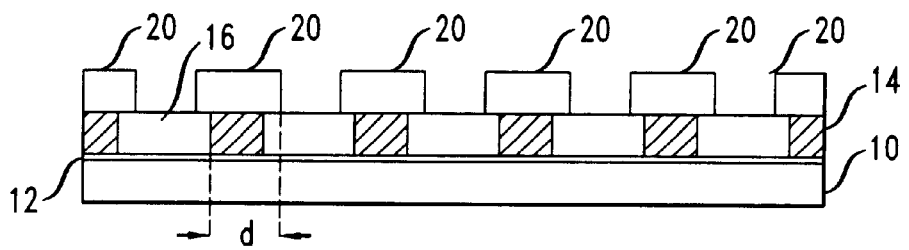
Figure 1G:
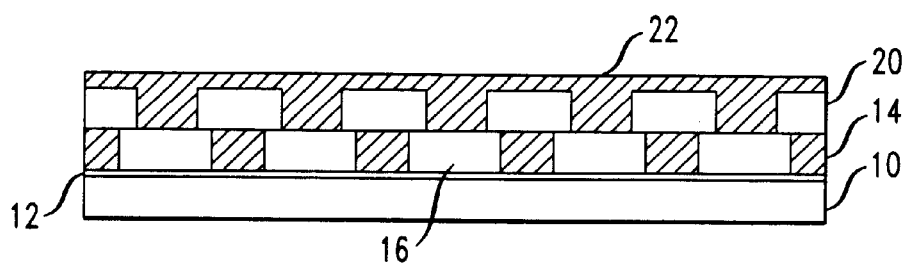

Next, as shown in FIG. 1E, a second silicon layer 18 is formed onto the silicon/silicon dioxide structure. This silicon layer 18 is patterned and etched to provide a lattice of silicon cylinders 20, the lattice having the same size and spacing as the first lattice. However, as shown in FIG. 1F, the (x,y) location of this second lattice is shifted from the (x,y) location of the first lattice of cylinders 16 by a distance d in the x direction. (Shift is measured by, e.g., the center-to-center change in the (x,y) location of the cylinders within a lattice, relative to the (x,y) location of the cylinders of another lattice.) Thus, if the first lattice has coordinates of (0,0), the second lattice has coordinates of (d,0). The reason for the shift, and the selection of the distance, d, is discussed in more detail below. Subsequently, as shown in FIG. 1G, a second silicon dioxide layer 22 is formed over the second lattice of silicon cylinders, and brought down to the top surfaces of the cylinders as discussed above.

Figure 1H:
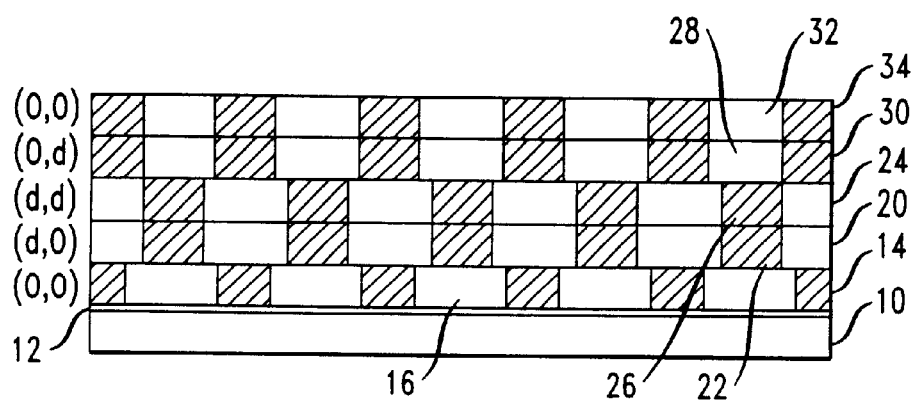

This process of forming lattices of silicon cylinders is continued, with each subsequent lattice typically having the same cylinder spacing and size as the previous lattices, but having an (x,y) location shifted from the previous lattice location according to the sequence x, y, −x, −y. Specifically, the second lattice, as noted above, is shifted the distance d in the x direction, relative to the first lattice location. The third lattice is shifted the distance d in the y direction, relative to the second lattice location. The fourth lattice is shifted in the −x direction, relative to the third lattice location. The fifth lattice is shifted in the −y direction, relative to the fourth lattice location, which puts the fifth lattice direction over the first lattice, i.e., in the same (x,y) location. This five-layer structure is illustrated in FIG. 1H, with the x,y coordinates for each lattice shown. The process of stacking lattices is generally performed until at least 15 lattice layers are formed, typically 15 to 20, to provide adequate characteristics in the final structure. Then, the silicon dioxide is etched from the structure, typically by exposure to aqueous HF.

Figure 2:
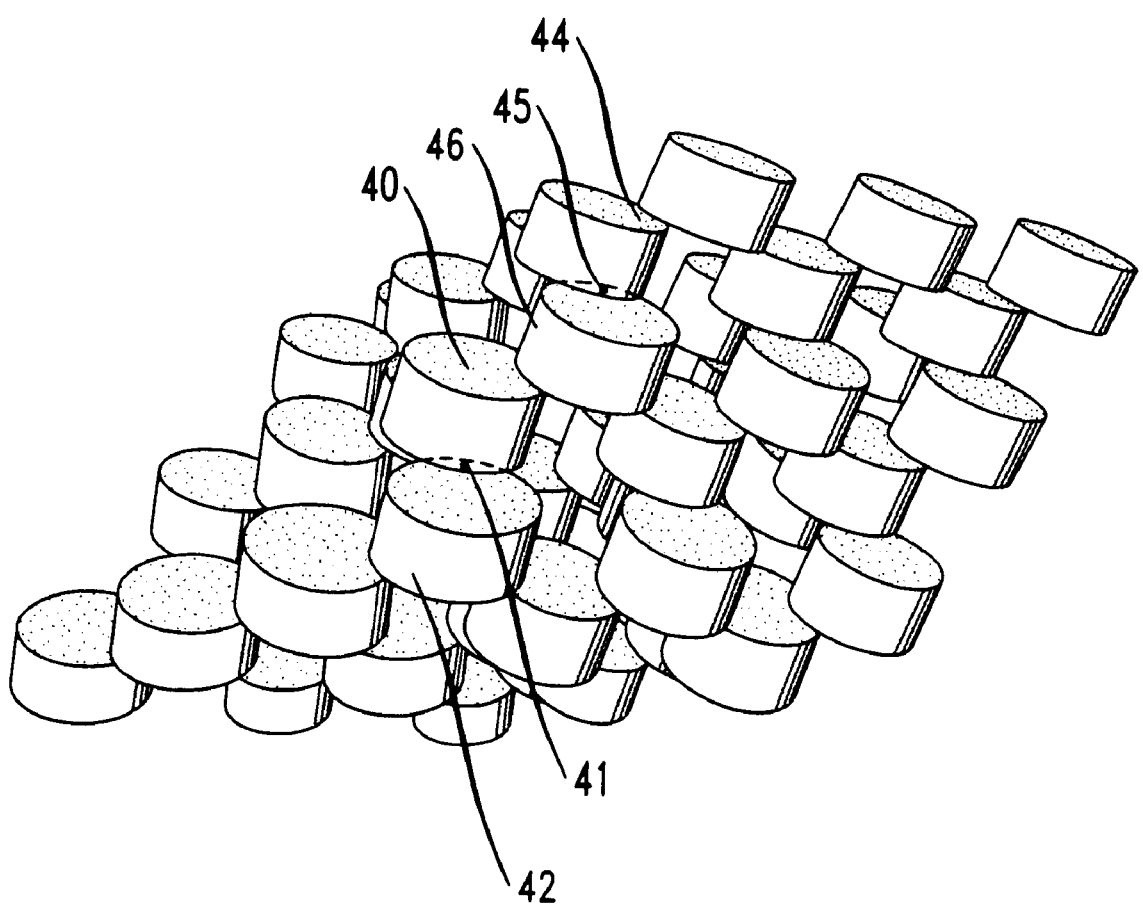
FIG. 2 illustrates a photonic band gap structure according to an embodiment of the invention.

According to this embodiment, a structure resembling a diamond lattice is provided. FIG. 2 is a three-dimensional representation of the structure, illustrating the multiple lattices of cylinders, e.g., 40, 42, 44, 46.

As noted above, it is also possible to form the structure by forming a silicon dioxide layer, and then etching out the desired shapes. The silicon is then deposited into the etched regions. Such an embodiment involves steps of:

forming a substantially planar layer of the silicon dioxide (e.g., about 2000 Å) over the substrate;

etching the silicon dioxide to selectively remove the oxide from regions that define the lattice of shapes;

forming a layer of silicon (e.g., about 3000 Å from the bottom of the etched regions) on the etched silicon dioxide layer to substantially fill—in fact overfill—the etched regions; and planarizing the silicon down to the surface of the silicon dioxide layer. Fabrication of the next layer typically involves:

forming a silicon nitride etch stop layer (e.g., about 250 Å) on top of the previous layer;

forming a second silicon dioxide layer;

selectively etching the second silicon oxide layer down to the nitride layer to form the initial portion of the regions for the lattice;

etching the nitride layer down to the previously-formed layer to finish forming the regions for the lattice;

overfilling the etched regions with silicon; and planarizing the silicon down to the level of the second silicon dioxide layer.

the silicon down to the level of the second silicon dioxide layer. Subsequent layers are similarly formed.

To provide a desirable photonic band gap for optical communications in such a structure, the silicon cylinders have a diameter of about 390 nm, a height of about 210 nm, and a pitch of about 600 nm (pitch meaning the center to center spacing of adjacent cylinders within a lattice), and the distance, d, of the x-y shifts is about 300 nm. This structure is calculated to exhibit a complete, three dimensional photonic band gap centered at about 1.55 µm, and extending from 1.45 to 1.65 microns, thereby completely covering the commonly-used optical communications band between 1.55 and 1.6 microns. For PBG applications, some variation in size among the individual cylinders is possible, as long as the long-range periodicity of the structure remains intact.

The structure of this embodiment was specifically designed to exhibit a bandgap at 1.55 µm. For stable, robust bandgaps, the periodicity of the lattice should be roughly equal to (within a factor of 2) the wavelength of interest. And to determine detailed specifications for a periodic structure, a band structure calculation must be performed. For systems exhibiting relatively large dielectric contrasts (e.g., silicon and air) the fields involved in non-propagating solutions (those within the bandgap) decay quickly with distance. Because of this rapid decay, structures having more than 15–20 layers will behave similarly to an infinitely periodic system. In such a case, the plane wave expansion method is an advantageous method for computing a band structure and determining the location of a band gap.

While a full vector solution to Maxwell's equations is necessary to adequately describe most band gap structures, a single band structure calculation contains enough information to tune a specific structure to a specific wavelength of light. Because Maxwell's equations can be written in a dimensionless form, the band structure solutions are completely determined by the ratio of wavelength to physical dimensions. This means that once a structure is designed for a particular wavelength, one need only scale the physical dimensions (leaving the structure unchanged) to place a different wavelength within the bandgap. For example, to create a material exhibiting a bandgap at 1.3 $\mu$m, all of the physical dimensions described for the above embodiment must simply be linearly scaled by (1.3/1.5). This scaling technique works for any type of electromagnetic radiation, e.g., for microwaves at 1.5 cm, the cylinders in the above embodiment would have a diameter of 390 $\mu$m (1000×390 nm).

As noted above, a PBG structure advantageously exhibits approximately spherical long-range symmetry, with unit cells that are not spherically symmetrical and thus break the degeneracy within the structure. The embodiment detailed above provides this structure, essentially by forming FCC units cells in which each basis atom of the cell (i.e., what would be the atom in an atomic FCC unit cell) is distorted into two extruded shapes, e.g., two cylinders, where the center of mass of the two shapes remains at the location of the basis atom. By having the center of mass remain at the basis atom location, long-range order is maintained. And by distorting the otherwise-symmetrical FCC unit cell, the necessary break in degeneracy is provided. In particular, the above embodiment reflects distortion of each basis atom of simple FCC units cells into two cylinders (or other extruded shapes), thereby providing a diamond lattice, which exhibits the desired break in degeneracy. It should be noted that variations of individual features, e.g., in the configuration/ size of particular shapes, are possible, due to particular designs or unavoidable aspects of processing. Such variations do not tend to significantly affect light passing through the material as long as the wavelength of the light is larger than the size of such variations. However, the long range periodicity of the basis atoms, which is on a much larger scale than such feature variations, does tend to significantly affect the properties of light passing through the material. Thus, while some variations among the individual shapes is acceptable, the long range periodicity must be carefully controlled.

For example, in the structure of FIG. 2, cylinder pairs 40, 42 and 44, 46 represent such a distortion, with the centers of mass, e.g., represented by point 41 and point 45, remaining at the basis atom position of the unit cell. In contrast to previous approaches that may contemplate such distortion, the technique of the invention makes it possible to form a distorted unit cell in a relatively easy manner that is readily performed by existing lithographic techniques, as reflected in the above embodiment.

As mentioned above, it is possible to engineer defects into the PBG material, to attain desired properties. Standard lithographic techniques are suitable for doing so, as part of the process detailed above. Possible defects include point defects (e.g., a missing shape, an undersized shape, an oversized shape), multipoint defects (e.g., large-small-large-small, a square formed from a variety of point defects), line defects, plane defects, and other more complicated defect structures. In addition to adjusting size and/or location of shapes, it is also possible to provide defects by introducing a distinct material into selected locations. Such engineered defects are able to guide and shape optical modes having energies within the photonic band gap of the material, e.g., making devices such a micro-lasers possible. See, e.g., S. Noda et al., "Full Three-Dimensional Photonic Bandgap Crystals at Near-Infrared Wavelengths," *Science,* Vol. 289 (2000).

Other embodiments of the invention will be apparent to those skilled in the art from consideration of the specification and practice of the invention disclosed herein.

What is claimed is:

1. A process for fabricating an article, comprising the steps of:
   (a) providing a substrate, the surface of the substrate defining an x-y plane;
   (b) forming a layer over the substrate, the layer comprising a lattice comprising shapes formed from a first material and interstices between the shapes substantially filled with a second material, the lattice being substantially planar with the x-y plane;
   (c) repeating step (b) for second, third, fourth, and fifth layers, wherein the lattice of the second layer is shifted a distance, d, in the x direction relative to the (x,y) location of the lattice of the first layer, wherein the lattice of the third layer is shifted the distance, d, in the y direction relative to the (x,y) location of the lattice of the second layer, wherein the lattice of the fourth layer is shifted the distance, d, in the –x direction relative to the (x,y) location of the lattice of the third layer, and wherein the lattice of the fifth layer is shifted the distance, d, in the –y direction relative to the (x,y) location of the lattice of the fourth layer; and
   (d) etching the second material from the structure.

2. The process of claim 1, further comprising the steps of repeating step (b), prior to the etching step, for sixth, seventh, eighth, and ninth layers, such that the lattices of the sixth, seventh, eighth, and ninth layers have the same (x,y) location as, respectively, the lattices of the second, third, fourth, and fifth silicon layers.

3. The process of claim 1, wherein step (b) comprises:
   forming a substantially planar layer of the first material over the substrate;
   etching the layer of first material in a pattern that provides the lattice;
   forming a layer of the second material on the lattice, such that the second material substantially fills the interstices between the shapes; and
   planarizing the layer of the second material down to the tops of the shapes of the lattice.

4. The process of claim 1, wherein step (b) comprises:
   forming a substantially planar layer of the second material over the substrate;
   etching the layer of second material to selectively remove the second material from regions that define the lattice;
   forming a layer of the first material on the etched layer of second material, such that the first material substantially fills the removed regions; and
   planarizing the layer of the first material down to the surface of the layer of the second material.

5. The process of claim 1, wherein the shapes are extruded shapes.

6. The process of claim 5, wherein the shapes are cylinders or squares.

7. The process of claim 6, wherein the extruded shapes are cylinders having a diameter of about 390 nm and a height of about 210 nm, wherein the cylinders within each lattice have a pitch of 600 nm, and wherein d is 300 nm.

8. The process of claim 1, wherein the minimum dimension of the shapes in the x-y plane is no less than about 250 nm.

9. The process of claim 1, wherein the first material is silicon and the second material is silicon dioxide.

10. The process of claim 9, wherein the resultant structure exhibits a three-dimensional photonic bandgap centered at about 1.55 µm and extending from about 1.45 to about 1.65 µm.

11. The process of claim 1, further comprising the steps of performing step (b) for at least 10 additional layers, wherein the (x,y) location of each lattice is shifted from the (x,y) location of the immediately preceding lattice by the distance, d, in a direction along the x or y axis according to the repeating sequence x, y, −x, −y.

12. The process of claim 11, wherein the resultant structure exhibits a photonic band gap centered at a wavelength of about 1.55 µm.

13. A process for fabricating an article comprising a photonic band gap structure, comprising the steps of:

providing a three-dimensional structure that comprises a plurality of stacked layers, each layer comprising a substantially planar lattice comprising shapes of a first material and interstices between the shapes, wherein each shape contacts at least one shape of an adjacent layer, wherein the interstices throughout the plurality of layers are interconnected, and wherein the interstices comprise a second material; and etching the second material from the interconnected interstices.

14. The process of claim 13, wherein the first material is silicon and the second material is silicon dioxide.

15. The process of claim 13, wherein the shapes are extruded shapes.

16. The process of claim 13, wherein the shapes of the three-dimensional structure resemble a diamond lattice.

17. The process of claim 13, wherein the three-dimensional structure comprises at least 15 layers.

18. An article comprising a photonic band gap structure, the photonic band gap structure comprising:

a first lattice comprising shapes, the lattice defining an x-y plane;

a second lattice comprising shapes formed on a portion of the first lattice, wherein the second lattice is shifted a distance, d, in the x direction relative to the (x,y) location of the first lattice;

a third lattice comprising shapes formed on a portion of the second lattice, wherein the third lattice is shifted the distance, d, in the y direction relative to the (x,y) location of the second lattice;

a fourth lattice comprising shapes formed on a portion of the third lattice, wherein the fourth lattice is shifted the distance, d, in the −x direction relative to the (x,y) location of the third lattice; and a fifth lattice comprising shapes formed on a portion of the fourth lattice, wherein the fifth lattice is shifted the distance, d, in the −y direction relative to the (x,y) location of the fourth lattice.

19. The article of claim 18, wherein the shapes comprise a first material, and interstitial space between the shapes comprises a second material.

20. The article of claim 19, wherein the shapes are formed from silicon, and the interstitial space between the shapes is filled with air.

21. The article of claim 18, wherein the shapes are extruded shapes.

22. The article of claim 21, wherein the extruded shapes are cylinders or squares.

23. The article of claim 20, wherein the shapes are cylinders having a diameter of about 390 nm and a height of about 210 nm, wherein the cylinders within each lattice have a pitch of 600 nm, and wherein d is 300 nm.

24. The article of claim 20, wherein the photonic bandgap structure exhibits a three-dimensional photonic bandgap centered at about 1.55 µm and extending from about 1.45 to about 1.65 µm.

25. The article of claim 18, further comprising:

a sixth lattice comprising shapes formed on a portion of the first lattice, wherein the sixth lattice is shifted a distance, d, in the x direction relative to the (x,y) location of the fifth lattice;

a seventh lattice comprising shapes formed on a portion of the first lattice, wherein the seventh lattice is shifted a distance, d, in the y direction relative to the (x,y) location of the sixth lattice;

a eighth lattice comprising shapes formed on a portion of the first lattice, wherein the eighth lattice is shifted a distance, d, in the −x direction relative to the (x,y) location of the seventh lattice; and a ninth lattice comprising shapes formed on a portion of the first lattice, wherein the ninth lattice is shifted a distance, d, in the −y direction relative to the (x,y) location of the eighth lattice.

26. The article of claim 25, wherein the shapes are extruded shapes.

27. The article of claim 18, further comprising at least 10 additional lattices comprising shapes, wherein the lattices are co-planar with the x-y plane, wherein the lattices are stacked sequentially in the z-direction, and wherein the (x,y) location of each lattice is shifted from the (x,y) location of the adjacent lattice in the −z direction by the distance, d, in a direction along the x or y axis according to the repeating sequence x, y, −x, −y.

28. The article of claim 18, wherein the photonic band gap structure resembles a diamond lattice.

* * * * *